United States Patent [19]

Schlotter, IV et al.

[11] Patent Number: 4,914,748

[45] Date of Patent: Apr. 3, 1990

[54] IN COMBINATION, A NOVELTY FLASHLIGHT AND PIECE OF CANDY FOR ILLUMINATION

[76] Inventors: William K. Schlotter, IV, 175 Toluca Rd., Stafford, Va. 22554; Thomas J. Coleman, 89 Winding Way Rd., Bristol, Va. 24201

[21] Appl. No.: 238,106

[22] Filed: Aug. 30, 1988

[51] Int. Cl.$^4$ ............................................. F21V 33/00
[52] U.S. Cl. ................................. 362/109; 362/208; 362/253; 362/806
[58] Field of Search ............... 362/109, 157, 186, 190, 362/208, 253, 806

[56] References Cited

U.S. PATENT DOCUMENTS 3,258,589 6/1966 Doring ................................. 362/186

4,231,077 10/1980 Joyce et al. ..................... 362/109 X

Primary Examiner—Stephen F. Husar

[57] ABSTRACT

This invention relates to novelties and in particular to a novel illuminated candy holding device. This device includes a replaceable candy cylinder attached to the end of a fashlight which is turned on to make the candy cylinder glow brightly while being consumed. It can be used as a wand, and after the candy has been consumed, the device can be employed as a miniature flashlight. The battery may be permanently sealed inside the case and is not replaceable. The device is provided with a removeable clear plastic cover which is placed over the candy and which is secured in place at one end, for protection and storage of the candy, by the flashlight end connector.

20 Claims, 1 Drawing Sheet

IN COMBINATION, A NOVELTY FLASHLIGHT AND PIECE OF CANDY FOR ILLUMINATION

This invention is directed to a novelty including a flashlight in combination with a piece of consumable candy which can be illuminated by the flashlight.

It is well known in the prior art that flashlights have been made and used in many different ways. U.S. Pat. No. 2,114,266 is directed to a small flashlight used to illuminate a key for placing the key in a lock; U.S. Pat. No. 2,696,384 is directed to a flashlight which simulates a lit cigar; U.S. Pat. No. 4,364,104 relates to a novelty light which is foldable and is opened to have the appearance of a switchblade knife; U.S. Pat. No. 4,464,861 sets forth a plush toy which includes a face that lights up; U.S. Pat. No. 4,600,974 is directed to an optically decorated baton; and U.S. Pat. No. 4,446,509 relates to a flashlight in combination with a compass which is lit for observing the compass. All of the above patents make use of a battery operated light for some specific purpose.

It is therefore an object of this invention to make use of a battery operated light to illuminate a piece of candy which can be consumed while illuminated or used as a novelty lighted toy when not being consumed.

Another object is to provide a flashlight connector which will support one end of a piece of candy in which upon being consumed, the candy may be replaced and/or the flashlight may be used as a light without the candy attached.

Still another object is to provide a covering for the piece of candy to prevent soiling or contaminating the candy.

Yet another object is to make an inexpensive novelty flashlight which is disposable when the battery has discharged and/or the candy has been consumed; while another object is to provide a more expensive novelty flashlight-candy device in which the candy, bulb and battery source may be replaced.

These and other objects will become clearer when related to the description of the drawings.

DETAILED DESCRIPTION

Figure 1:
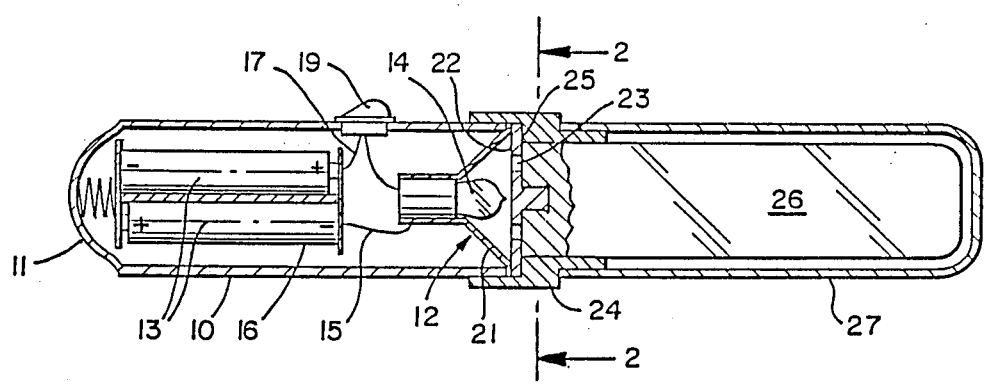
FIG. 1 is a partial cross-section view of a novelty flashlight combined with a piece of candy.
Figure 2:
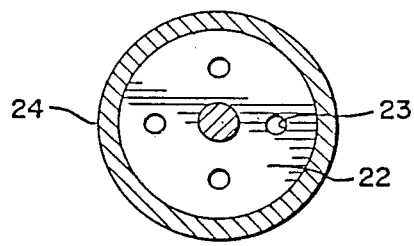
FIG. 2 is a top view of a lens used in the device.
Figure 3:
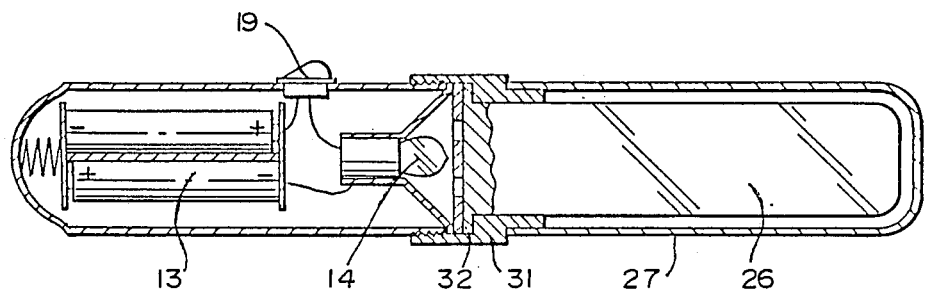
FIG. 3 is a more expensive flashlight-candy device in which the candy is held in place and is replaceable.

Now referring to FIGS. 1 and 2 there is shown an inexpensive flashlight-candy device made in accordance with the invention. As shown, the flashlight includes a housing (10) having a closed end (11) and an open end (12). An electrical energy source (13), which may be at least one battery, supplies a current to a bulb (14) via an electrical circuit including an electrical conductor (15) extending from the base of the bulb to the negative end (16) of the battery source and an electrical conductor (17) that extends from the positive end of the battery source to the center contact (18) on the bulb. A switch (19) is placed in the electrical circuit extending from the positive end of the battery to the center conductor of the bulb in order to control the current to the bulb. The bulb is supported in a reflector (21) having a reflective surface toward the open end of the housing which reflects the light out of the open end of the flashlight housing via a lens (22). The lens (22) may be clear plastic or it may be opaque and provided with apertures (23) through which the light shines. The reflector and lens are held in place by an end connector (24) which is open on each end. One end of the end connector fits over the end of the housing (10) and has a portion (25) that rests against the lens to hold the lens and reflector in place in the housing. An elongated piece of transparent candy (26) having the shape of the connector on one end is slid into the connector for securing the candy to the connector and flashlight. The flashlight and candy may be of any desired shape; however, it is desired that they be cylinderical. The transparent candy should be hard such as a well known sucker. The candy is covered by a protective covering (27) which is closed on one end and open on the opposite end so that the covering may be slipped over the candy and over the end of the connector with a tight fit. The flashlight housing may be made of any durable material which may be formed or molded into any desired shape such as cylinderical. Since the novelty device is to be used by children, the device should have no sharp features. It should be of a so called non-breakage material and non toxic. The device is shown with two small batteries. Any number of batteries and any desired size battery may be used. However, if the device is to be made so that the batteries are not replaceable, the batteries should be as inexpensive as possible for operation over a useful period of time. The switch may be a slide switch, a push on-off switch or a contact switch which only completes the circuit while being pushed to make contact with a circuit completing contact. If a switch of the latter type is used, a user such as a small child will not leave the light on while not being held or in use. If the device as shown in FIGS. 1 and 2 is of a disposable type with non-replaceable batteries, then the connector (24) can be permanently affixed to the flashlight housing by any suitable means such as epoxy or any adhesive. FIG. 3 illustrates a novelty flashlight-candy device which includes a screw threaded connector (31) which may be threaded onto the flashlight housing. The piece of candy may be formed with a cylindrical shoulder (32) on the secured end which is secured in place by the screw threaded connector. In this illustrated device, the bulb (14) and the batteries (13) could be secured within the housing such that they are replaceable by removing the connector and candy, then replacing the candy and threading the connector back on to the flashlight housing. Also, the connector may be removed to replace the piece of candy. The protective cover (27) will also be used in this modification. By using a lens that has spaced apertures, the candy piece could be made with linear sections of different colors so that the light beams shining through the different apertures in the lens can be aligned with the different colored candy sections and different colored light will be seen in the candy.

What is claimed:

1. A novelty flashlight which comprises;
   a housing,
   an electrical source in said housing,
   a light bulb in and near an open end in said housing,
   an electrical circuitry including said electrical source for operating said light bulb,
   a switch means in said electrical circuitry for controlling current to said bulb,
   a connector on an open end of said housing juxtaposed said bulb, and a light conducting piece of candy secured to said housing by said connector whereby light from said light bulb may be conducted into said piece of candy by operation of said switch means.

2. A novelty flashlight as set forth in claim 1, wherein;
said housing is closed on one end
said electrical source is at least one battery secured in said housing, and
a reflector for reflecting light from said bulb into said piece of candy.

3. A novelty flashlight as set forth in claim 1, in which;
said piece of candy is elongated, cylindrical, hard and of solid consistency.

4. A novelty flashlight as set forth in claim 3, which includes;
a protective covering over said piece of candy.

5. A novelty flashlight as set forth in claim 4, in which;
said covering is closed on one end and includes an open end which is secured to said connector on said open end of said housing.

6. A novelty flashlight as set forth in claim 2, which comprises;
a lens between said reflector and said piece of candy.

7. A novelty flashlight as set forth in claim 3, which comprises;
a lens between said connector and said piece of candy.

8. A novelty flashlight as set forth in claim 4, which comprises;
a lens between said reflector and said piece of candy.

9. A novelty flashlight as set forth in claim 5, which comprises;
a lens between said connector and said piece of candy.

10. A novelty flashlight as set forth in claim 6, in which;
said lens is formed of opaque material and includes a plurality of apertures therein through which light is reflected into said piece of candy.

11. A novelty flashlight as set forth in claim 7, in which;
said lens is formed of opaque material and includes a plurality of apertures therein through which light is reflected into said piece of candy.

12. A novelty flashlight as set forth in claim 8, in which;
said lens is formed of opaque material and includes a plurality of apertures therein through which light is reflected into said piece of candy.

13. A novelty flashlight as set forth in claim 9, in which;
said lens is formed of opaque material and includes a plurality of apertures therein through which light is reflected into said piece of candy.

14. A novelty flashlight as set forth in claim 1, in which;
said housing includes screw threads on said open end,
said connector includes screw threads on an inner surface of one end, and
said threaded end of said connector is screw threaded onto said threaded open end of said housing which secures said piece of candy to said novelty flashlight.

15. A novelty flashlight as set forth in claim 2, in which;
said housing includes screw threads on said open end,
said connector includes screw threads on an inner surface of one end, and
said threaded end of said connector is screw threaded onto said threaded open end of said housing which secures said piece of candy to said novelty flashlight.

16. A novelty flashlight as set forth in claim 10, in which;
said housing includes screw threads on said open end,
said connector includes screw threads on an inner surface of one end, and
said threaded end of said connector is screw threaded onto said threaded open end of said housing which secures said piece of candy to said novelty flashlight.

17. A novelty flashlight as set forth in claim 14, in which;
said piece of candy includes a flange on one end, and
said screw threaded connector secures said piece of candy on said open end of said housing by said flange.

18. A novelty flashlight as set forth in claim 15, in which;
said piece of candy includes a flange on one end, and
said screw threaded connector secures said piece of candy on said open end of said housing by said flange.

19. A novelty flashlight as set forth in claim 16, in which;
said piece or candy includes a flange on one end, and
said screw threaded connector secures said piece of candy on said open end of said housing by said flange.

20. A novelty flashlight as set forth in claim 10, in which;
said piece of candy is made with elongated sections of different color which different color sections corresponds with said apertures in said lens.

* * * * *